June 19, 1962  R. A. ROOF  3,039,299

BAG TESTING MACHINE

Filed March 11, 1959  4 Sheets-Sheet 1

Robert A. Roof
INVENTOR

BY Mason, Porter, Diller & Stewart
ATTORNEY

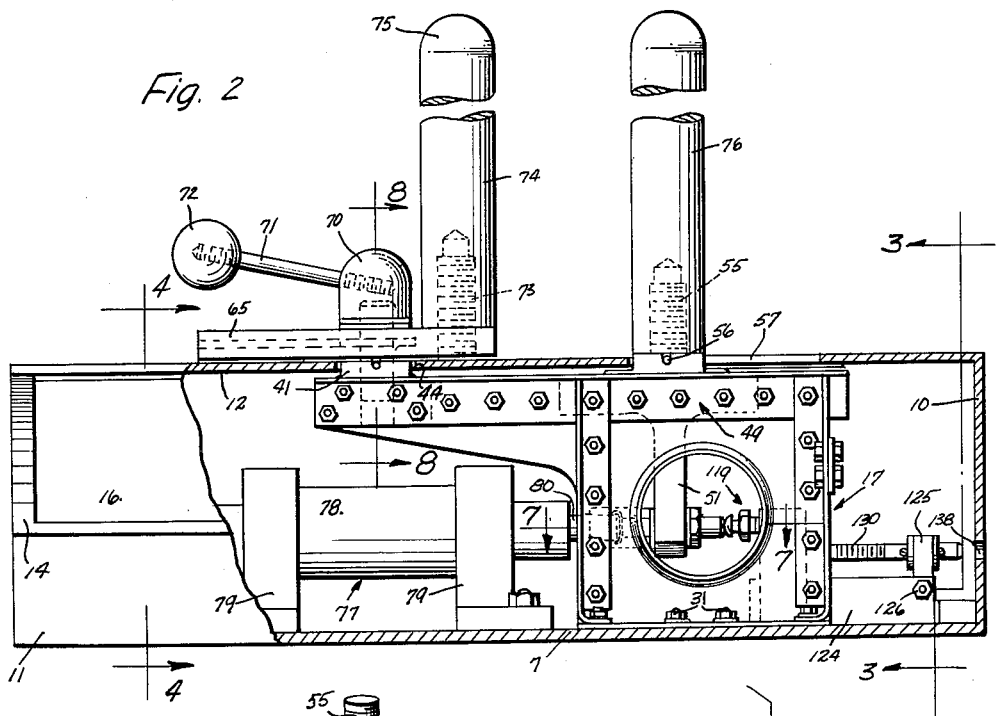
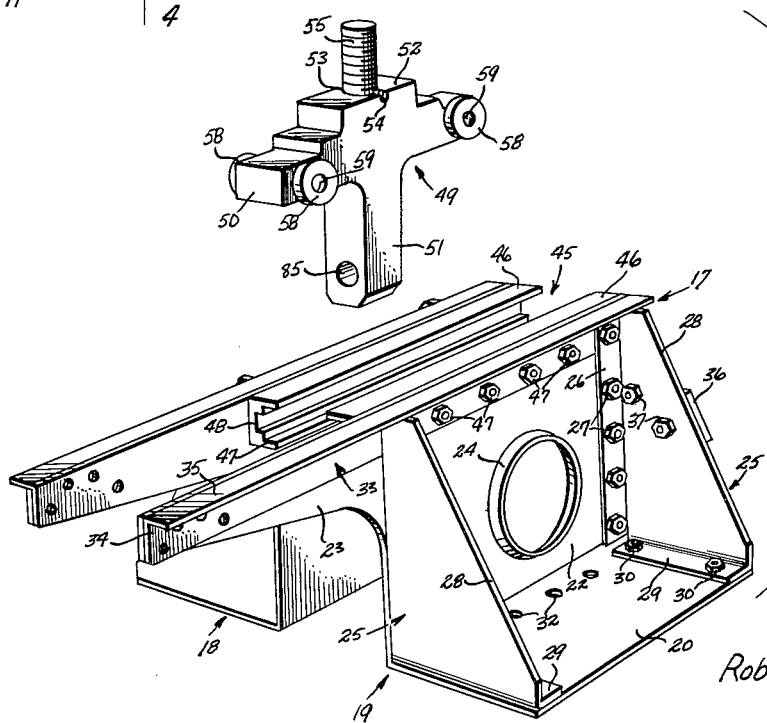

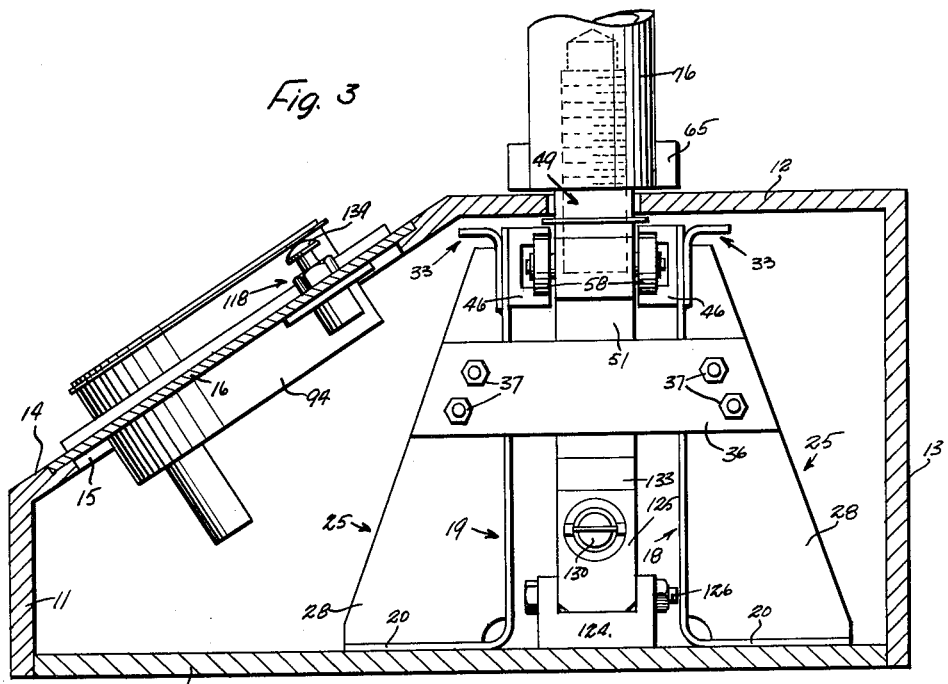
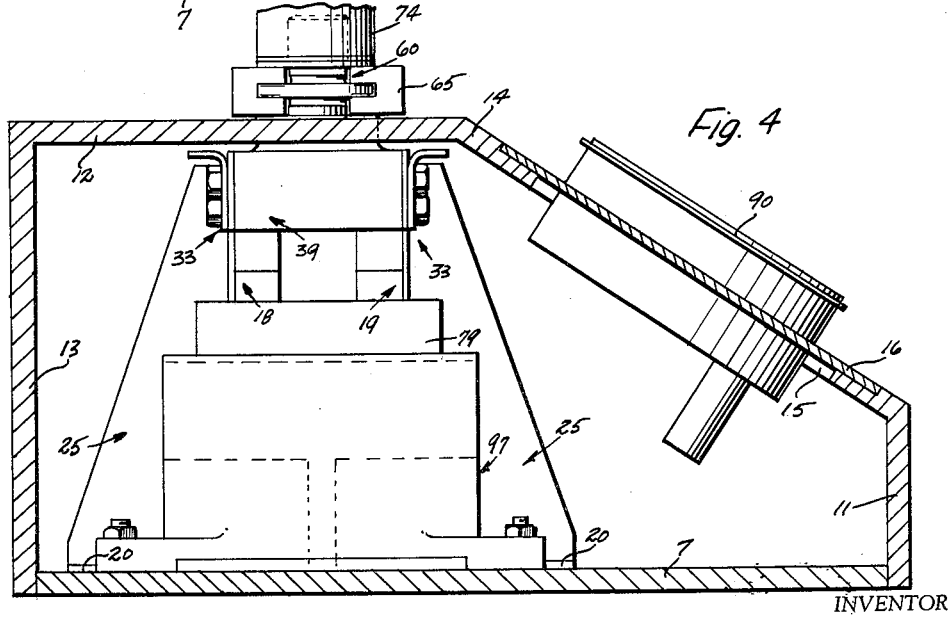

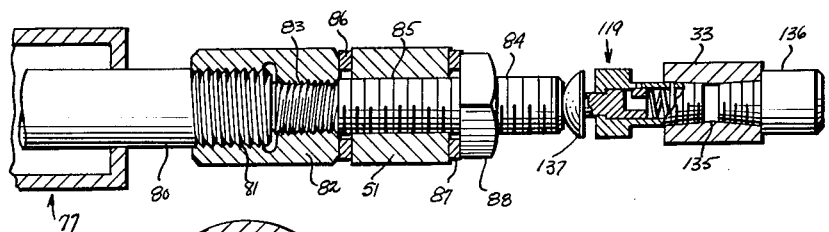
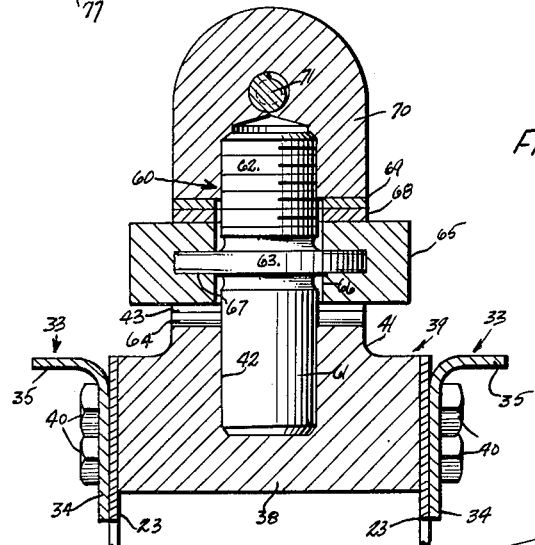
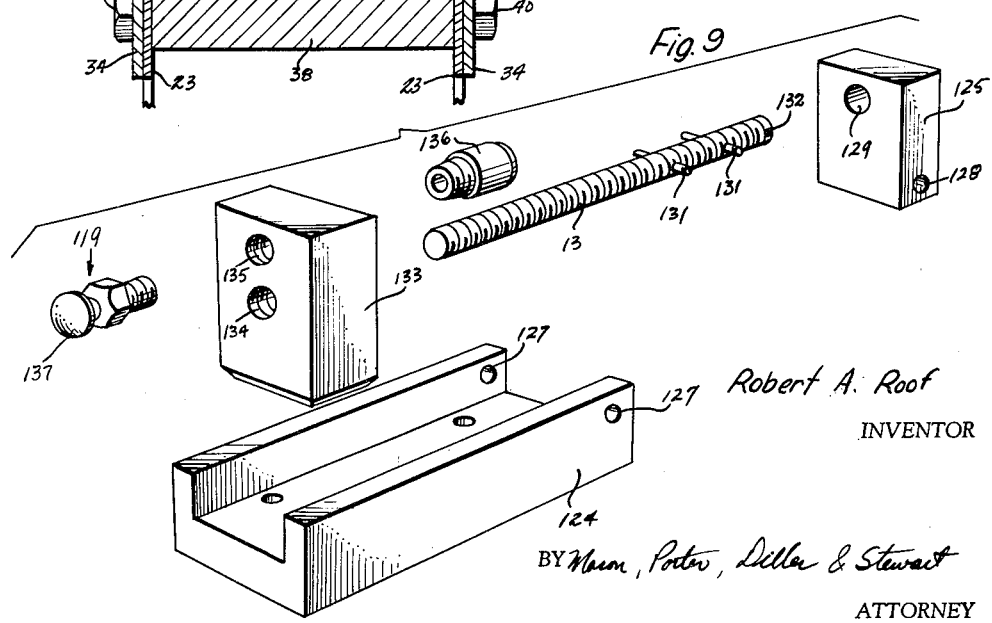

United States Patent Office 3,039,299
Patented June 19, 1962

1

3,039,299
BAG TESTING MACHINE
Robert A. Roof, Whittier, Calif., assignor to Continental Can Company, Inc., New York, N.Y., a corporation of New York
Filed Mar. 11, 1959, Ser. No. 798,666
8 Claims. (Cl. 73—96)

The invention relates generally to the art of testing bags, and primarily seeks to provide a novel bag testing machine for determining the force required to rupture the tube portion of a bag.

For many years, it has been the standard practice to cut strips transversely of the creased edges of a bag and to test the strength of the strips on a standard tensile testing machine. Attempts have also been made to test the strength of the creases of a bag using a standard burst test, such as the Mullen test, in an effort to determine the strength characteristics of such creased portions. However, in both of these tests, it has been impossible to achieve a true correlation of the strength factors as related to the ultimate use of the bag.

In accordance with the invention, it is proposed to provide a bag testing machine which utilizes a pair of rounded mandrels, which fit the bag to be tested, and to force the mandrels apart utilizing a fluid system equipped with a gauge. If the bag tears other than on a crease, no damage has been done in fabrication. On the other hand, if tearing occurs on the crease, the gauge of the fluid system would indicate the extent of damage.

Another object of the invention is to provide a novel bag testing machine, the machine including a fixed arm in the form of a mandrel, and a movable arm also in the form of a mandrel, the movable arm having connected thereto a piston rod of an extensible fluid motor whereby the movable arm may be moved away from the fixed arm while the two arms are disposed within an inverted bag, and there being provided a fluid system including means for controlling the pressure of fluid admitted to the fluid motor whereby the force exerted on the movable arm to move it away from the fixed arm and thus rupture the bag being tested may be gradually increased, and the fluid system also including a gauge whereby the force required to rupture the bag may be readily ascertained.

Another object of the invention is to provide a novel bag testing machine which includes a rigid frame having secured thereto a fixed arm mount with which there is associated a slide bar carrying a fixed arm, the slide bar being adjustable relative to the fixed arm mount whereby the position of the fixed arm with respect to the frame may be varied, the frame also including a trackway receiving a movable arm mount on which there is mounted a movable arm, there being connected to the movable arm a fluid motor for moving the movable arm away from the fixed arm to exert a bag-rupturing pressure on a bag tube, the adjustable mounting of the fixed arm permitting the bag testing machine to test bags of all sizes within the desired range.

Still another object of the invention is to provide a novel bag testing machine wherein there is provided a pair of arms in the form of mandrels which are received in the tube portion of a bag being tested, one of the arms being fixed and the other of the arms being movable and connected to a piston rod of an extensible fluid motor, the fluid motor being part of a fluid system which includes a pressurized fluid source and a pressure control valve whereby the pressure exerted on a bag tube by the arms may be gradually increased until the bag tube bursts, and there being provided a restriction in the fluid line to the fluid motor whereby when the bag bursts, the rate of movement of the fluid motor and the movable arm connected thereto is restricted.

2

A further object of the invention is to provide a machine particularly designed for the testing of bags, the machine being so formed whereby a completed bag may be tested in its entirety by merely placing the tube portion of the bag over a pair of arms, one of which is fixed and the other of which is movable, and there being provided a fluid system for effecting the movement of the movable arm and force indicating means for indicating the amount of force exerted on the arm to effect the bursting of the bag being tested.

With the above, and other objects in view that will hereinafter appear, the nature of the invention will be more clearly understood by reference to the following detailed description, the appended claims, and the several views illustrated in the accompanying drawing.

In the drawing:

FIGURE 2 is an enlarged front elevational view of the bag testing machine with a portion of the housing thereof broken away and shown in section in order to illustrate the details of the interior construction of the bag testing machine.

FIGURE 3 is an enlarged transverse sectional view taken along the line 3—3 of FIGURE 2 and shows the general details of the same construction at the right end thereof, as viewed in FIGURE 2.

FIGURE 4 is an enlarged transverse sectional view taken along the line 4—4 of FIGURE 2 and shows the general position of the valve for controlling the flow of fluid to the fluid motor.

FIGURE 5 is an enlarged exploded perspective view of the frame, the trackway and the movable arm mount.

FIGURE 7 is an enlarged fragmentary horizontal sectional view taken along the line 7—7 of FIGURE 2 and shows the relationship between an extension on a piston rod of the fluid motor and one of the poppet valves.

FIGURE 8 is an enlarged fragmentary vertical sectional view taken along the line 8—8 of FIGURE 2 and shows the manner in which the fixed arm is adjustably mounted.

FIGURE 9 is an exploded perspective view of the components for adjustably positioning one of the poppet valves.

Figure 1:
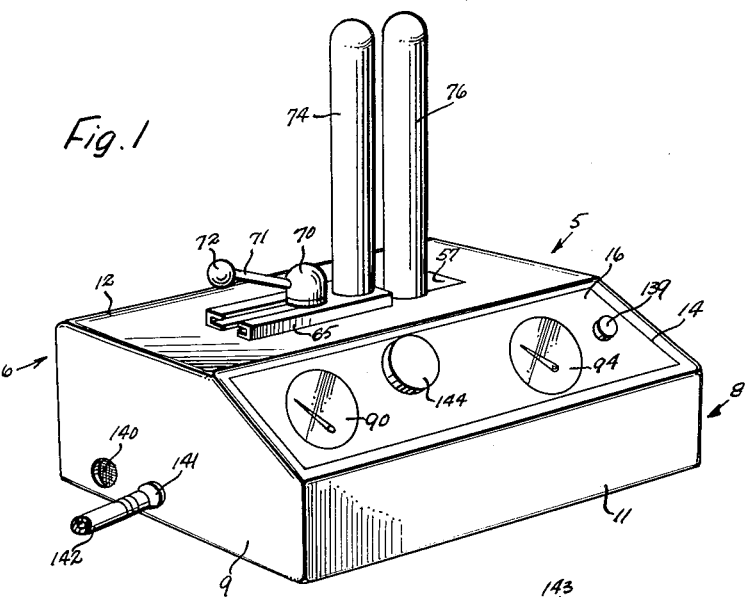
FIGURE 1 is a perspective view of the bag testing machine and shows the general external appearance thereof.

In the example of embodiment of the invention herein disclosed, the entire bag testing machine is referred to in general by the numeral 5. The bag testing machine includes a housing generally referred to by the numeral 6. The housing 6 is formed of a base plate 7 and an upper housing member, generally referred to by the numeral 8. The upper housing member 8 includes a pair of end walls 9 and 10, and a partial front wall 11, a partial top wall 12, and a rear wall 13 which extend between the end walls 9 and 10. An upwardly sloping wall 14 extends between the upper edge of the partial front wall 11 and the forward edge of the partial top wall 12. This upwardly sloping wall has a cutout 15 therein in which there is seated a panel 16 which is removably secured to the upwardly sloping wall 14 in any desired manner. Also, the upper housing member 8 is suitably removably secured to the base plate 7 in any desired manner.

The housing 6 has mounted therein in the position best illustrated in FIGURE 2 a frame which is referred to generally by the numeral 17. The frame 17 is rigidly secured to the base plate 7 and includes a pair of main frame members 18 and 19 which are identical except for being left and right. Each of the main frame members 18 and 19 includes a base 20 and an upstanding body portion 22. An extension 23 extends to the left of each of the body portions 22, and in order to reduce the weight of the body portion 22, it is provided with an enlarged central lightening opening 24.

Each of the main frame members 18 and 19 is reinforced at the vertical edges of its body portion 22 by means of vertical frame members 25. Each vertical frame member 25 includes a flange 26 which is disposed in face-to-face engagement with the body portion 22 and is secured thereto by means of a plurality of vertically spaced fasteners 27. A second flange 28 projects outwardly from the body portion 22. The flange 28 terminates at the lower end thereof in a foot 29 which is secured to the base 20 by means of fasteners 30. The fasteners 30 may also extend through the base 20 into the base plate 7 so as to facilitate the securing of the main frame members 18 and 19 to the base plate 7. Additional fasteners 31 (FIGURE 2) may be passed through bores 32 in the base 20.

The upper edge of each of the main frame members 18 and 19 is also reinforced by an angle member generally referred to by the numeral 33. Each angle member 33 includes a vertical flange 34 which is disposed in face-to-face relation with respect to the body portion 22, and a horizontal flange 35 which is disposed uppermost and which extends outwardly from the body portion 22. The angle members 33 are secured to the main frame members 18 and 19 by certain of the fasteners 27 and other fasteners to be described hereinafter.

As is best illustrated in FIGURE 3, the right hand ends of the main frame members 18 and 19 are connected together by a strap 36 which extends between the flanges 28 of the vertical frame members 25. The strap 36 is secured to the flanges 28 by means of fasteners 37.

The left hand ends of the main frame members 18 and 19 are connected together by the positioning of a base 38 of a fixed arm mount 39 between the extensions 23. The base 38 is secured in place by means of a plurality of fasteners 40 which pass through the vertical flanges 34 of the angle members 33, the extensions 26, and into the base 38.

The fixed arm mount 39 also includes a boss 41 which extends upwardly from the base 38. The boss 41 has a bore 42 disposed centrally thereof and extending down into the base 38. The boss 41 also has a transverse slot 43 in the upper part thereof, the slot 43 extending diametrically of the bore 42. As is best shown in FIGURE 2, the partial top wall 12 of the upper housing member 8 is provided with an opening 44 through which the boss 41 projects.

Referring once again to FIGURE 5 in particular, it will be seen that the frame 17 includes a trackway which is referred to in general by the numeral 45. The trackway 45 includes a pair of rails 46 which are secured to the inner faces of the individual body portions 22 adjacent the upper edges thereof. The rails 46 are secured in place by a plurality of fasteners 47, the fasteners 47 also passing through the vertical flanges 34 of the angle members 33 to facilitate the connection of the angle members 33 to the main frame members 18 and 19. Each of the rails 46 is generally C-shaped in cross-section, and includes an outer longitudinal recess 47' and an inner longitudinal recess 48.

The details of the movable arm mount, referred to generally by the numeral 49, are illustrated in FIGURE 5. The movable arm mount 49 includes an elongated body portion 50 which has integrally connected to a central part thereof a depending portion 51. An upwardly projecting central portion 52 is also formed integrally with the body portion 50. The central portion 52 is provided with a bore 53 which is aligned with the depending portion 51, and a slot 54 extends transversely of the central portion 52 at the upper end thereof and diametrically of the bore 53. A fastener 55 is seated in the bore 53 and projects upwardly out of the central portion 52. The upper portion of the fastener 55 is externally threaded and the fastener 55 is prevented from rotating relative to the movable arm mount 49 by a transverse pin 56 (FIGURE 2) which is seated in the transverse slot 54. Also shown in FIGURE 2 is an elongated slot 57 formed in the partial top wall 12 of the upper housing member, the slot 57 receiving the central portion 52 of the movable arm mount 49.

The movable arm mount 49 is supported relative to the frame 17 by means of wheels 58 which are seated in the recesses 47' of the rails 46 and bear against the rails 46. The wheels 58 are supported by transverse axles 59 which extend through the body portion 50. The ends of the axles 59 project into the recesses 48. Thus, the movable arm mount 49 is mounted for movement longitudinally of the frame 17.

Reference is now had to FIGURE 8 wherein there are illustrated the details of means for adjustably mounting a fixed arm or mandrel. These means include an elongated pin referred to generally by the reference numeral 60. The pin 60 includes a smooth lower portion 61, an externally threaded upper portion 62, and an intermediate collar 63. The smooth lower portion 61 of the pin 60 is seated in the bore 42 and a transverse pin 64 is seated in the slot 43 so as to prevent rotation of the pin 60.

An elongated slide bar 65 is adjustably mounted on the pin 60. The slide bar 65 has a vertical slot 66 therethrough which extends longitudinally of the slide bar 65 for a major portion of the length thereof, and which opens out through the left end thereof, as viewed in FIGURE 2. A horizontal slot 67 extends transversely of the vertical slot 66 with the horizontal slot 67 opening through the left end of the slide bar 65. The slide bar 65 is engaged over the pin 60 with the collar 63 being disposed in the horizontal slot 67. Thus, vertical movement of the slide bar 65 relative to the pin 60 is prevented.

The externally threaded upper portion 62 of the pin 60 projects above the slide bar 65 and has telescoped thereover a pair of washers 68 and 69. A nut 70 is threadedly engaged on the upper end of the externally threaded upper portion 62, and the nut 70 is provided with a handle 71 to facilitate the turning thereof. The handle 71 is provided remote from the nut 70 with a knob 72 to facilitate the gripping thereof. By utilizing the handle 71, the nut 70 may be readily rotated so as to either loosen or tighten the nut, thus facilitating the adjustment of the slide bar 65 with respect to the fixed arm mount 39.

Reference is now had to FIGURE 2, wherein it is clearly shown that the slide bar 65 is disposed above the partial top wall 12 of the upper housing member 8. An upwardly projecting fastener 73 is carried by the right end portion of the slide bar 65 with the projecting fastener 73 being in the form of an externally threaded stud. The fastener 73 has removably threadedly engaged thereon an upstanding arm or mandrel which will be referred to as the fixed arm 74. As illustrated, the fixed arm 74 is circular in cross-section and is provided with a rounded upper end 75. However, the shape of the fixed arm 74 may be varied depending upon the shape of the bag to be tested. A second arm or mandrel is disposed in spaced parallel relation to the fixed arm 74, and this second arm or mandrel is referred to as a movable arm 76. The movable arm 76 is of the same construction as the fixed arm 74 and is threadedly engaged on the upper end of the fastener 55.

In the testing of a bag, the fixed arm 74 will remain stationary in an adjusted position and the movable arm 76 will be moved away from the fixed arm 74 to exert a force on a bag being tested. Movement of the movable arm 76 is brought about by means of an extensible fluid motor generally referred to by the numeral 77. The fluid motor 77 is of the double acting piston and cylinder type and includes a cylinder 78 having mounting members 79 at opposite ends thereof. A piston rod 80 extends from the right end of the cylinder 78.

Reference is now had to FIGURE 7 wherein it is illustrated that the piston rod 80 has an externally threaded end portion 81 over which there is threadedly telescoped a part of a coupling 82. An elongated externally threaded fastener 84 is threadedly engaged in a reduced bore 83 of the coupling 82. The fastener 84 extends through a horizontal bore 85 in the depending portion 51 of the movable arm mount 49. A spacer 86 is disposed intermediate the depending portion 51 and the coupling 82 and a second spacer 87 is disposed on the opposite side of the depending portion 51 from the coupling 82. A nut 88 is threadedly engaged on the fastener 84 and bears against the spacer 87 to securely lock the depending portion 51 to the fastener 84. Thus, as the piston rod 80 is reciprocated, the movable arm mount 49 is also reciprocated carrying with it the movable arm 76.

Figure 6:
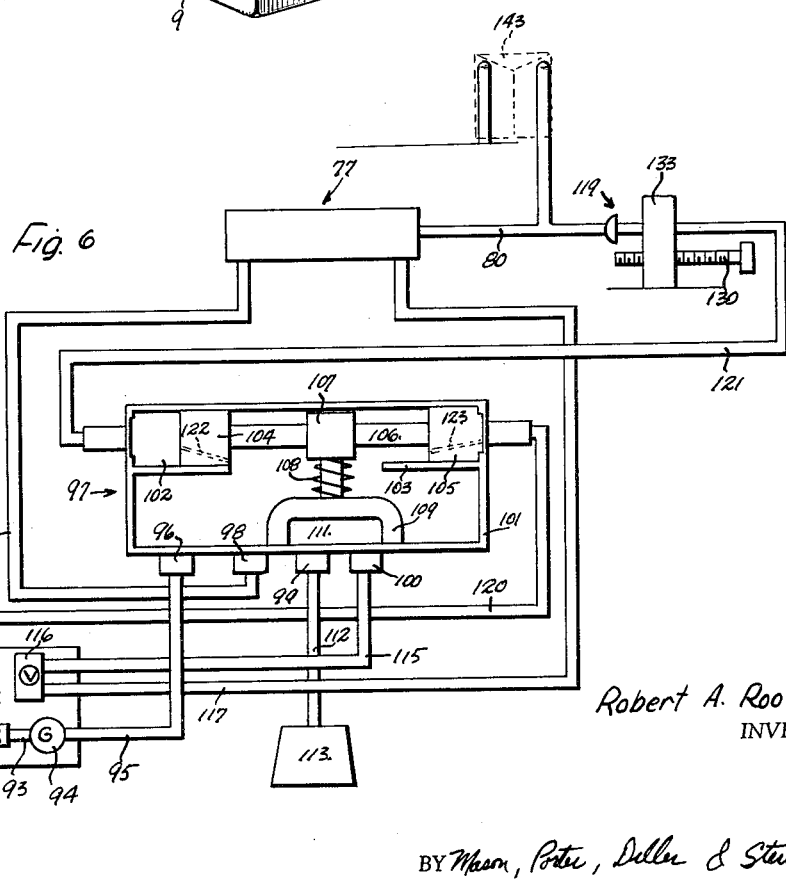
FIGURE 6 is a hydraulic diagram for the bag testing machine.

In FIGURE 6, there is diagrammatically illustrated the fluid system for the fluid motor 77. This fluid system includes a fluid supply line 89 which has one end thereof connected to any suitable fluid supply source. The opposite end of the fluid supply line 89 is connected to a line pressure gauge 90. A fluid line 91 is connected to the line pressure gauge 90 and the opposite end of the fluid line 91 is connected to a pressure regulating valve 92. A fluid line 93 is connected to the outlet of the pressure regulating valve 92 and the opposite end of the fluid line 93 is connected to the test pressure gauge 94. One end of a fluid line 95 is connected to the test pressure gauge 94 and the other end of the fluid line 95 is connected to a fitting 96 of a control valve 97. The control valve 97 is a hand operated poppet controlled four-way valve, Model No. V-250-R valve manufactured by Galland-Henning, Nopak Division, of Milwaukee, Wisconsin.

The control valve 97 also includes fittings 98, 99 and 100, all of which open into the interior of a housing 101 of the control valve 97. The housing 101 also has formed therein a pair of aligned cylinders 102 and 103 in which there are mounted pistons 104 and 105 connected together by an integral piston rod 106. A mounting block 107 is secured to the central portion of the piston rod 106. The mounting block 107 also is connected to a rod 108 which extends at right angles to the piston rod 106. A flow control member 109 is slidably mounted on the rod 108 and is urged by means of a spring 110 into engagement with that wall of the housing 101 carrying the fittings 96, 98, 99 and 100. It is to be noted that the flow control member 109 has a fluid passage 111 of a size to bridge any two adjacent ones of the fittings 98, 99 and 100.

A return line 112 is connected to the fitting 99 and this line may be considered an exhaust line when the fluid utilized is air. The end of the return line 112 is provided with an exhaust muffler 113. A fluid line 114 extends between one end of the cylinder of the fluid motor 77 and the fitting 98. Another fluid line 115 extends between the fitting 100 and a flow control valve 116. The flow control valve 116 restricts the volume of flow therethrough and has connected thereto a fluid line 117 whose opposite end is connected to the opposite end of the cylinder of the fluid motor 77 from the fluid line 114.

The position of the flow control member 109 is controlled by means of a pair of poppet valves 118 and 119. The poppet valve 118 is connected to the end of the cylinder 103 by means of a fluid line 120 and the poppet valve 119 is connected to the end of the cylinder 102 by means of a fluid line 121. Fluid enters into the ends of the cylinders 102 and 103 beyond the pistons 104 and 105 by means of restricted passages 122 and 123 formed in the pistons 104 and 105, respectively. In this manner, the pressures on the pistons 104 and 105 are normally balanced. However, when either of the poppet valves 118 or 119 is actuated to vent the end of its respective one of the cylinders 102 and 103, the pressures on the pistons 104 and 105 become unbalanced with the result that the pistons 104 and 105, together with the piston rod 106 and the flow control member 109, shift in the direction from which the fluid is vented.

The poppet valve 118 is a manually actuated one and is utilized to start the bag testing operation. On the other hand, the poppet valve 119 serves to control the movement of the piston rod 80 and is engaged by an extension of the piston rod 80 so as to automatically shift the control member 109 to reverse the stroke of the fluid motor 77. The length of stroke of the fluid motor 77 is controlled by adjustably mounting the poppet valve 119 in a manner best illustrated in FIGURE 9.

The means mounting the poppet valve 119 includes a generally channel-shaped track member 124 which is suitably secured to the base plate 7 in longitudinal alignment with the fluid motor 77 at the right end thereof, as viewed in FIGURE 2, the control valve 97 being mounted at the left end of the fluid motor 77. An upstanding block 125 is seated in the right end of the track member 124, and the block 125 is held in place by a fastener 126 which extends through aligned bores 127 and 128 extending transversely through the track member 124 and the block 125. The block 125 is also provided with an upper horizontal bore 129 which extends longitudinally of the track member 124. An externally threaded feed screw 130 is rotatably journaled in the bore 129. The feed screw 130 is positioned with respect to the block 125, for rotation only, by means of a pair of pins 131 disposed on opposite sides of the block 125. The right hand end of the feed screw 130 is provided with a screwdriver slot 132 to facilitate the rotation thereof.

A slide block 133 is slidably mounted in the track member 124. The slide block 133 has an internally threaded bore 134 which is aligned with the bore 129 and which has threadedly engaged therein the feed screw 130. Thus, by rotating the feed screw 130, the position of the slide block 133 may be varied.

An upper portion of the slide block 133 has extending therethrough an internally threaded bore 135 in which there is threadedly engaged the poppet valve 119. A fitting 136 is threadedly engaged in the opposite end of the bore 135 and the fluid line 121 is connected to the fitting 136. At this time, it is pointed out that the poppet valve 119 is provided with a plunger 137 which, when depressed, serves to open the poppet valve 119. It is this plunger that is engaged by the fastener 84 when the fluid motor 77 reaches the end of its out-stroke. The feed screw 130 is adjusted through an opening 137 in the end wall 10 (FIGURE 2).

Reference is now had to FIGURES 1 and 3, wherein it is shown that the poppet valve 118 is mounted on the plate 16 adjacent the right edge thereof. The poppet valve 118 has a plunger 139 which projects above the plate 16 so that it may be manually operated.

In FIGURE 1, the end wall 9 of the upper housing member 8 is illustrated as having an exhaust opening 140. The exhaust muffler 113 is coupled to the end wall 9 and opens through the exhaust opening 140. A supply fitting 141 is carried by the end wall 9 adjacent the exhaust opening 140. The supply fitting 141 has connected thereto a supply line 142 which may be connected to any desired pressurized air source.

*Operation*

In a bag testing operation, it is first determined the type of arm on which the bag is to be positioned. Assuming that the type of arm illustrated in FIGURE 1 is to be used, the fixed arm 74 is secured to the slide bar 65, and the movable arm 76 is secured to the movable arm mount 49. Then, the initial position of the fixed arm 74 with respect to the movable arm 76 is adjusted by loosening the nut 70 utilizing the handle 71, shifting the slide bar 65 on the pin 60 and then tightening the nut 70 to maintain the fixed position of the fixed arm 74. The bag to be tested, for example, the bag 143 of FIGURE 6, then has the tube portion thereof telescoped over the arms 74 and 76.

At the start of the bag testing operation, the pressure regulating valve 92 is in a low pressure position. The poppet valve 118 is manually opened to start the bag testing operation. This results in the shifting of the control member 109 to the position illustrated in FIGURE 6 with the result that fluid is admitted to the left end of the fluid motor 77 and fluid is vented from the right end of the fluid motor 77. The piston rod 80 thus moves to the right with the result that the movable arm 76 is moved away from the fixed arm 74 until such time as the bag 143 is firmly seated on the arms 74 and 76 and further movement of the movable arm 76 away from the fixed arm 74 is retarded by the bag 143.

Pressure is now exerted on the tube of the bag 143 being tested by controlling the setting of the pressure regulating valve 92 through the use of a control knob 144 which projects above the plate 16. As the pressure to the fluid motor 77 increases, the pressure on the tubular bag 143, tending to burst the bag, increases. At the same time, the pressure is indicated on the test pressure gauge 94. Incidentally, this gauge of the double indicator type so as to indicate the maximum pressure involved during the bag testing operation. The pressure of the fluid to the fluid motor 77 is increased until such time as the bag bursts. The load being suddenly taken off the movable arm 76, the fluid motor 77 has a tendency to move rapidly. However, the flow of fluid from the fluid motor 77 at this time is controlled by the flow control valve 116, with the result that the rate of movement of the piston rod 80 is limited. The fluid motor 77 is permitted to continue to operate until such time as the poppet valve 119 is actuated, at which time the positions of the pistons 104 and 105 are reversed, and the flow control member 109 is shifted to the left, wherein the fittings 98 and 99 are communicated and the fittings 96 and 100 are communicated. At this time, fluid under pressure is admitted to the right end of the fluid motor 77 and fluid is exhausted from the left end of the fluid motor 77, and the piston rod 80 returns to its fully retracted position. The bag 143 may then be removed from the arms 74 and 76 and inspected for the cause of failure. The bag testing machine 5 is now in position for the reception of the next bag to be tested.

The advantages of the bag testing machine 5 are obvious ones. When it is desired to test a bag, such as the bag 143, it is merely necessary to place the bag over the proper arms, such as the fixed arm 74 and the movable arm 76, and to depress the plunger 139 of the poppet valve 118. The operation of the bag testing machine is automatic and the bursting pressure is recorded by the test pressure gauge 94. The bag testing machine tests a bag as it exists under normal use conditions and permits one to obtain an accurate appraisal of the strength characteristics of a bag.

While one form of the invention has been shown for purposes of illustration, it is to be clearly understood that various changes in the details of construction and arrangement of parts may be made without departing from the spirit and scope of the invention as defined in the appended claims.

I claim:

1. In a testing machine for tubular members of the type which includes a pair of relatively movable arms for applying the desired force during a testing operation; an arm assembly, said arm assembly comprising a frame, a trackway carried by said frame, a movable arm mount carried by said trackway for guided movement therealong, a fixed arm mount fixedly secured to said frame in spaced relation to and aligned with said trackway, a movable arm, first mounting means securing said movable arm to said movable arm mount for movement with said movable arm mount, a fixed arm, and second mounting means securing said fixed arm to said fixed arm mount, said second mounting means including a pin secured to said fixed arm mount, a slide bar slidably carried by said pin for movement in a plane parallel to said trackway, and means carried by said slide bar mounting said fixed arm on said slide bar for movement with said slide bar whereby said fixed arm may have its position relative to said movable arm adjusted to permit said arms to receive bags of various sizes, said pin having a collar intermediate its ends and said slide bar having an elongated longitudinal slot intermediate the slide bar faces, said collar having a thickness substantially equal to the dimension of said slot normal to said slide bar faces whereby said slide bar is supported against movement longitudinally of said pin.

2. The structure of claim 1 wherein said collar is circular in outline whereby relative rotation between said slide bar and said pin may be obtained.

3. A bag testing machine comprising a frame, a fixed arm projecting from said frame, a movable arm projecting from said frame adjacent to and generally parallel to said fixed arm, mounting means fixedly mounting said fixed arm relative to said frame, an extensible fluid motor including a cylinder and a projecting piston rod, means fixedly mounting said cylinder relative to said frame, means connecting said piston rod to said movable arm to move said movable arm back and forth relative to said fixed arm and generally parallel to said fixed arm whereby a tube portion of a bag telescoped over said fixed arm and said movable arm may be tensioned and thus tested by moving said movable arm away from said fixed arm, a compressed fluid source, fluid flow means connecting said fluid motor to said compressed fluid source, said fluid flow means including a control valve for controlling the flow of fluid to and from said fluid motor, said control valve including a shiftable flow control member, a cylinder, a double ended piston mounted within said last mentioned cylinder and connected to said flow control member for shifting said flow control member, said control valve having means for pressurizing said last mentioned cylinder at opposite ends of said piston, and vent means for individually venting opposite ends of said last mentioned cylinder to effect the shifting of said piston and the resultant shifting of said flow control member, said vent means being in the form of two separate pressure releasing valves, means mounting one of said pressure releasing valves adjacent said piston rod, and means on said piston rod for engaging said one pressure releasing valve at the end of a bag testing stroke of said fluid motor to operate said control valve and thus automatically return said fluid motor to its starting position.

4. The bag testing machine of claim 3 wherein the other of said pressure releasing valves has a manual operator for manually controlling the shifting of said control valve to initiate a cycle of operation of said fluid motor.

5. The bag testing machine of claim 3 wherein said fluid flow means include a pressure control valve for regulating the force exerted by said fluid motor on said movable arm during a bag testing operation.

6. The bag testing machine of claim 3 wherein said fixed arm mounting means includes a fixed arm mount fixedly secured to said frame, a pin secured to said fixed arm mount, a slide bar slidably carried by said pin for movement in a plane normal to the axis of said fixed arm, and means carried by said slide bar mounting said fixed arm on said slide bar for movement with said slide bar whereby said fixed arm may have its position relative to said movable arm adjusted to permit said arms to receive bags of various sizes, said pin having a collar intermediate its ends and said slide bar having an elongated longitudinal slot intermediate the slide bar faces, and said collar having a thickness substantially equal to the dimension of said slot normal to said slide bar faces whereby said slide bar is supported against movement longitudinally of said pin.

7. A bag testing machine comprising a frame, a fixed arm projecting from said frame, a movable arm projecting from said frame adjacent to and generally parallel to said fixed arm, mounting means fixedly mounting said fixed arm relative to said frame, an extensible fluid motor including a cylinder and a projecting piston rod, means fixedly mounting said cylinder relative to said frame, means connecting said piston rod to said movable arm to move said movable arm back and forth relative to said fixed arm and generally parallel to said fixed arm whereby a tube portion of a bag telescoped over said fixed arm and said movable arm may be tensioned and thus tested by moving said movable arm away from said fixed arm, a compressed fluid source, fluid flow means connecting said fluid motor to said compressed fluid source, said fluid flow means including a control valve for controlling the flow of fluid to and from said fluid motor, said control valve including a shiftable flow control member, a cylinder, a double ended piston mounted within said last mentioned cylinder and connected to said flow control member for shifting said flow control member, said control valve having means for pressurizing said last mentioned cylinder at opposite ends of said piston, and vent means for individually venting opposite ends of said last mentioned cylinder to effect the shifting of said piston and the resultant shifting of said flow control member, said vent means being in the form of two separate pressure releasing valves, means mounting one of said pressure releasing valves adjacent said piston rod, and means on said piston rod for engaging said one pressure releasing valve at the end of a bag testing stroke of said fluid motor to operate said control valve and thus automatically return said fluid motor to its starting position, said one pressure releasing valve mounting means including a track, a pressure releasing valve support slidably mounted in said track, means securing said one pressure releasing valve to said pressure releasing valve support, and feed means connected to said pressure releasing valve support for controlling the position of said one pressure releasing valve relative to said piston rod.

8. The bag testing machine of claim 7 wherein the other of said pressure releasing valves has a manual operator for manually controlling the shifting of said control valve to initiate a cycle of operation of said fluid motor.

References Cited in the file of this patent
UNITED STATES PATENTS

| | | |
|---|---|---|
| 1,564,197 | Brown | Dec. 8, 1925 |
| 2,708,363 | Nass | May 17, 1955 |

FOREIGN PATENTS

| | | |
|---|---|---|
| 369,364 | Great Britain | Nov. 18, 1931 |
| 593,112 | Great Britain | Oct. 8, 1947 |